Oct. 6, 1953 W. B. INNES 2,654,387
APPARATUS FOR CONTROLLING THE FLOW OF GASES
Filed March 19, 1952
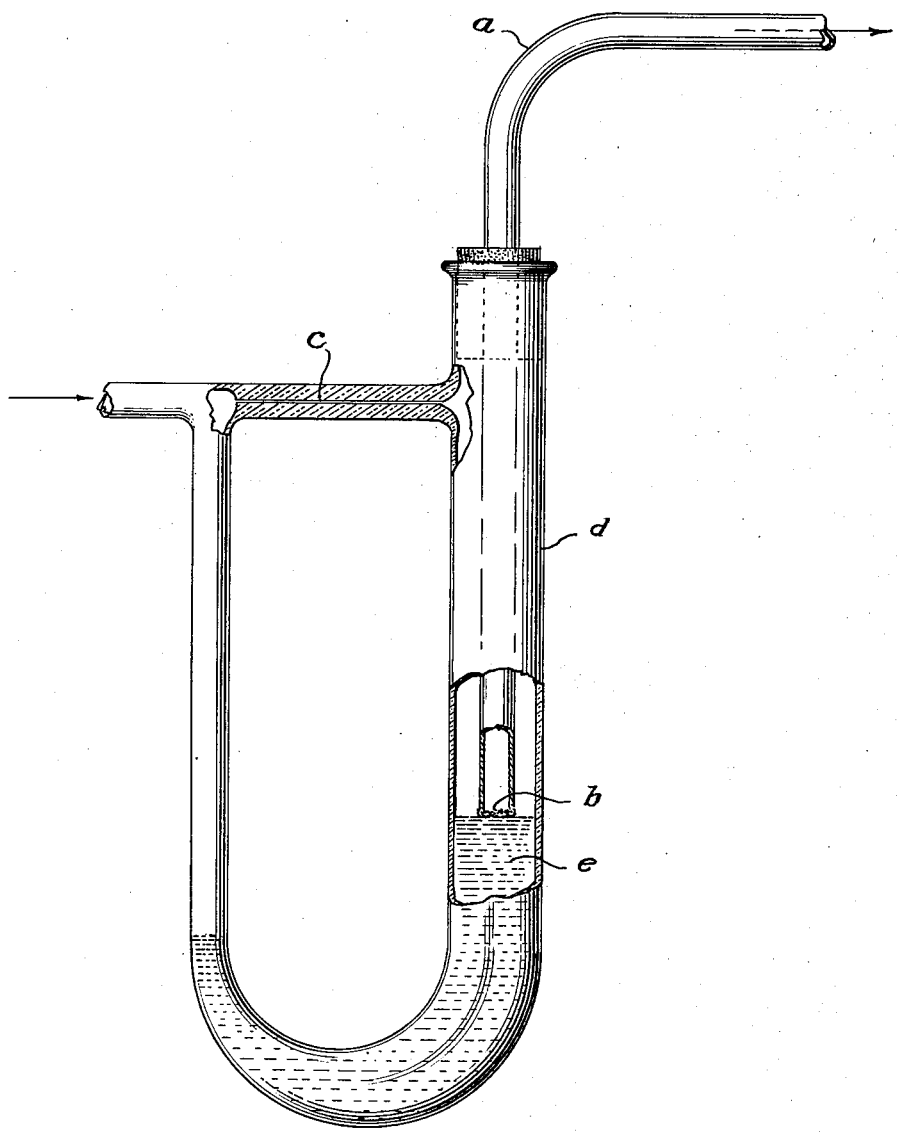
INVENTOR
WILLIAM B. INNES,
BY
ATTORNEY Patented Oct. 6, 1953

2,654,387

UNITED STATES PATENT OFFICE 2,654,387

APPARATUS FOR CONTROLLING THE FLOW OF GASES

William B. Innes, Stamford, Conn., assignor to American Cyanamid Company, New York, N. Y., a corporation of Maine Application March 19, 1952, Serial No. 277,420

3 Claims. (Cl. 137—251)

This invention relates to a new and improved method and apparatus for the control of gas flow, and is a continuation-in-part of my application, Serial No. 223,048, filed April 26, 1951. Although devices for the control of gas flow are well-known in the art, they have been designed for passing large volumes of gas at rapid flow rates and are not readily adapted for regulating a smaller gas flow within precise limits.

It is an advantage of the present invention that flow rates in the neighborhood of 5 cc. per minute and below may be maintained within a range of better than ± 3 percent. My new flow controller is, therefore, of particular value in combination with apparatus for the measurement of surface area and pore volume, as described in my copending application Serial No. 223,048, filed April 26, 1951.

My invention will be described in greater detail in conjunction with the accompanying drawing, which illustrates a specific embodiment of the invention. With reference to the drawing, it will be observed that the operation of this controller is dependent upon a fritted glass member $b$, which is sealed into tube $a$; the pore diameter of the fritted glass is so small and the contact angle with the liquid $e$ is such that the fritted glass acts as a semi-permeable membrane, allowing gas to pass, but not liquid. Any increase in pressure across capillary $c$ will cause the liquid to rise in tube $d$ and close off tube $a$, which reduces the pressure drop across the capillary.

A decrease in pressure across the capillary $c$ permits the level of the liquid in tube $d$ to drop, which increases the gas flow through tube $a$ and increases the pressure across the capillary. The fore pressure of the entering gas may be conveniently maintained by the action of any pressure regulator well-known in the art.

The fritted glass member $b$ may be any semi-permeable membrane of sufficient physical strength to withstand the pressure differential, providing the pore size is such that the liquid will not penetrate the membrane. Likewise, any liquid which does not react with or damage the semi-permeable membrane may be employed, providing its vapor pressure is insignificant at the operating temperature. For purposes of illustration, I have employed a fritted glass member in the drawing, and I prefer to use mercury as the liquid $e$.

The maximum pore size of the membrane, which must not be exceeded, can be readily calculated from the capillary rise Equation 1 and the contact angle must exceed 90°. Thus, for the combination of mercury and fritted glass, we find that the membrane pore size should be under 12 microns, where $$h = \frac{2\gamma \cos \theta}{g \rho r} \quad (1)$$

or $$r = \frac{2\gamma \cos \theta}{g \rho h} \quad (2)$$

$h$=capillary depression or pressure difference required before flow will occur (assume 100 cm. Hg).
$\gamma$=surface tension of liquid (540 ergs/cm.² for Hg).
$\theta$=contact angle (140° for mercury of moderate cleanliness).
$g$=gravitational constant (980 cm./sec./sec.).
$r$=radius of pore or capillary in cm.
$\rho$=density of liquid (14.2 g./cc. for mercury).
substituting in Equation (2)

$$r = \frac{2 \times 540 \times \cos 140°}{980 \times 14.2 \times 100} = 6 \times 10^{-4}$$

The pressure across the capillary may be varied widely by moving the tube $a$ and its semi-permeable membrane up or down within the tube $b$. In general, however, I prefer to adjust my apparatus so that the pressure across the capillary $c$ is between about one and 20 cm. of mercury.

Since the flow rate is determined by Poiseuille's law, the length and bore of the capillary tube $c$ may be calculated for any predetermined rate of flow. I have found that using a capillary of approximately 0.001 inch bore, 4 inches long, with a pressure drop across the capillary of 3 lbs./sq. inch, the flow rate is 8 cc. per minute.

I claim:

1. An apparatus adapted to control the rate of flow of a gas, which comprises a closed U-tube containing sufficient liquid to partially fill both vertical arms; a capillary tube connecting the top portions of said vertical arms; a semi-permeable membrane the pores of which are permeable to gas but impermeable to said liquid, one surface of said semi-permeable membrane being connected to the apparatus requiring constant gas flow and the other surface being positioned close to said liquid in one of the vertical arms of said U-tube, the other vertical arm being connected by suitable means to the source of gas which it is desired to control.

2. An apparatus adapted to control the rate of flow of a gas, which comprises a closed U-tube containing sufficient mercury to partially fill both vertical arms; a capillary tube connecting the top portions of said vertical arms; a semi-permeable membrane the pores of which are permeable to gas but impermeable to mercury, one surface of said semi-permeable membrane being connected to the apparatus requiring constant gas flow and the other surface being positioned close to said mercury in one of the vertical arms of said U-tube, the other vertical arm being connected by suitable means to the source of gas which it is desired to control.

3. An apparatus adapted to control the rate of flow of a gas, which comprises a closed U-tube containing sufficient mercury to partially fill both vertical arms; a capillary tube connecting the top portions of said vertical arms; a fritted glass member the pores of which are permeable to gas but impermeable to mercury, one surface of said glass member being connected to the apparatus requiring constant gas flow and another surface being positioned close to the mercury in one of the vertical arms of said U-tube, the other vertical arm being connected by suitable means to the source of gas which it is desired to control.

WILLIAM B. INNES.

References Cited in the file of this patent

UNITED STATES PATENTS

| Number | Name | Date |
|--------|------|------|
| 638,002 | Berry | Nov. 28, 1899 |
| 2,267,274 | Gardner | Dec. 23, 1941 |
| 2,565,616 | Mennesson | Aug. 28, 1951 |